3,152,174
MANUFACTURE OF MONOCHLOROACETIC ACID
Elton K. Morris and William W. Bakke, Midland, Mich., assignors to The Dow Chemical Company, Midland, Mich., a corporation of Delaware
No Drawing. Filed Apr. 21, 1960, Ser. No. 23,659
6 Claims. (Cl. 260—539)

This invention concerns an improved method for making monochloroacetic acid.

Monochloroacetic acid has long been made by chlorinating acetic acid in the presence of catalysts and removing from the monochlorinated product dichloroacetic acid and other by-products of the reaction. It is well known that these operations are difficult to accomplish economically in a manner yielding a product of satisfactory purity. The chlorination is usually carried out by passing chlorine into a mixture of glacial acetic acid and acetic anhydride and/or acetyl chloride while heating the mixture under reflux at a reaction temperature, usually from 80° to 110° C., and venting the gaseous hydrogen chloride which is formed. After completing the reaction, the monochloroacetic acid product is crystallized and then subjected to recrystallization and/or solvent extraction operations to remove impurities, especially dichloroacetic acid, down to a point at which the monochloroacetic acid is of a purity acceptable on the market. The dichloroacetic acid boils at close to the same temperature as monochloroacetic acid and cannot satisfactorily be removed by distillation. It is for this reason that the purification is carried out in the manner just stated. For most purposes, it is necessary that the monochloroacetic acid be purified to a point at which it retains 2 weight percent or less of dichloroacetic acid. The mother liquor and extract obtained in purifying monochloroacetic acid to this extent usually contain at least 3 pounds of monochloroacetic acid and unconsumed acetic acid per pound of dichloroacetic acid. The mono- and dichloroacetic acids present in the mother liquor and/or extract cannot economically be separated from one another and are usually discarded. For these reasons a small reduction in the proportion of dichloroacetic acid formed in the chlorination reaction, and present in the chlorinated material, results in a valuable increase in yield of the monochloroacetic acid recoverable as a product of sufficient purity for use or marketing. This is all the more important because monochloroacetic acid is a large tonnage material. Also, a reduction in the proportion of dichloroacetic acid, relative to monochloroacetic acid, formed in the chlorination reaction to a value within the limits of purity of monochloroacetic acid required for marketing the latter would avoid the need for most, if not all, of the above-mentioned usual purification steps and would be highly desirable if it were attainable without undue increase in the cost of manufacture.

The crude reaction mixtures heretofore produced by passing chlorine into a heated starting mixture of acetic acid and about 5–10 weight percent of acetic anhydride until most, e.g., about 90 percent, of the acetic acid has been monochlorinated have usually contained about 5–7 percent dichloroacetic acid, based on the combined weight of the same and of the monochloroacetic acid.

In U.S. Patent 2,826,610, an improved process for making monochloroacetic acid is shown. There it is taught that higher yields of monochloroacetic acid can be attained by increasing the proportion of catalyst previously used. Thereby, by-product dichloroacetic acid is reduced.

It has now been discovered that even higher yields up to about 98.5 weight percent monochloroacetic acid, acetic acid reactant basis, can be achieved by chlorinating acetic acid in the presence of 6–15 mole percent acetic anhydride and/or acetyl chloride, total acetyls basis, as catalyst and in the presence of a minor amount of ferric chloride, antimony trichloride, aluminum chloride or iodine, i.e., from about 0.1 to about 1 mole percent, total acetyls basis, as an inhibitor of dichloroacetic acid formation, at a reaction temperature between 80° and 120° C. during a time between 8 and 100 hours until from 85 to 98 percent of the total acetyl groups present have been monochlorinated. Thereby dichloroacetic acid can be kept to a maximum of about 1.5 mole percent, acetic acid reactant basis. By "total acetyls" basis is meant mole equivalents of acetyl groups arising from acetic acid, acetic anhydride and acetyl chloride.

In practice, chlorine is fed into a mixture of glacial acetic acid and a total of from 6 to 15, preferably from 6 to 12, mole percent, total acetyls basis, of one or more of the above-mentioned catalysts and from 0.1 to 1 mole percent, total acetyls basis, of ferric chloride, antimony trichloride, aluminum chloride, iodine or their mixtures at a pressure of from 0 to 30, preferably from 0 to 7, p.s.i.g. and at a rate requiring from 8 to 100, preferably from 24 to 60, hours for introduction of the amount of chlorine theoretically required to monochlorinate the acetyl groups of the acetic acid and catalytic starting materials, while heating at a temperature between 80° and 120° C., advantageously between 100° and 110° C. and preferably at 100° C., and maintaining the proportion of catalytically active ingredients in the mixture within the limits just stated. Hydrogen chloride gas, formed by the reaction, is periodically or continuously vented. The introduction of chlorine can be terminated when from 85 to 98 percent, and usually from 93 to 97 percent, of the acetic acid fed to the reaction as such or as acetyl chloride or acetic anhydride has been monochlorinated. Chlorination in the manner and under the conditions just stated results in more efficient and complete utilization of the chlorine than is obtained under other chlorination conditions. For example, under these conditions, 97–100 percent utilization of the chlorine input is achieved.

The anhydride and acid chloride of acetic acid can be removed from the chlorinated mixture, or can be hydrolyzed in known ways to obtain the monochloroacetic acid product in a form free of the same. The product is monochloroacetic acid containing only a small and usually tolerable proportion of dichloroacetic acid, i.e., up to about 1.5 mole percent. If necessary, the proportion of dichloroacetic acid in the product can be further reduced by the known recrystallization and extraction operations hereinbefore mentioned.

Although the process can, with advantage, be carried out using any combination of the above-described permissible reaction conditions to obtain unusually good yields or marketable monochloroacetic acid, the following procedure is preferred. Chlorine is fed at substantially atmospheric pressure, e.g., at from 0 to 7 p.s.i.g., to a total mixture of acetic acid, from 6 to 15 mole percent of one or more of the aforementioned catalysts and from about 0.1 to about 1 mole percent, total acetyls basis, of one or more of the aforesaid inhibitors at a rate requiring from 24 to 60 hours for monochlorination of the total acetyls while heating the mixture at reaction temperatures of from 100° to 110° C. and venting gaseous hydrogen chloride from the mixture as it is formed. As the reaction is continued, acetic anhydride or acetyl chloride, and iodine, when used, is added continuously at a rate equivalent to the loss of acetyl chloride and iodine vented with the hydrogen chloride so as to maintain throughout the reaction a total of from 6 to 15 mole percent of catalyst and the desired amount of iodine in the mixture. In practice, and depending upon the efficiency of the condenser system used with the vent gases, the catalyst addition rate will go through a maximum during the first 30 percent of the chlorination and then rapidly taper off to almost nothing after about 90 percent of the chlorination has been completed. This preferred mode of operation permits the chlorination to be carried out as extensively as desired, e.g., to a point at which from 93 to 98 percent of the total acetyl groups present have been monochlorinated. The chlorinated mixture can be treated with the amount of water required to hydrolyze the acid anhydride and/or acid chloride contained therein. Alternatively, the chlorinated mixture can be distilled to strip out volatiles such as acetic acid, acetic anhydride and acetyl chloride for recycle in a subsequent chlorination. If desired, inhibitor can be removed from product monochloroacetic acid by distilling off the latter under vacuum. The monochloroacetic acid thus directly obtained is usually of a quality suitable for use or marketing.

The following examples describe completely specific embodiments of the process invented, and set forth the best mode contemplated by the inventors of carrying out their invention. They are not to be construed as limiting the scope of the invention.

*Example 1*

A glass chlorinator equipped with chlorine inlet, hydrogen chloride vent, thermometer well and refrigerated condenser system to return condensed catalyst was charged with 3060 g. glacial acetic acid, 1055 g. acetic anhydride and 40 g. anhydrous ferric chloride. This mixture was heated to a controlled temperature of 100° C. and chlorinated over an 8 to 10 hour period at substantially atmospheric pressure. During the chlorination, acetic anhydride was continuously added at a varying rate so as to maintain the catalyst concentration substantially as given above. During the chlorination, particularly in the first 3 to 4 hours, a total of 9.9 g. of Dow-Corning 200 silicone antifoam oil was added in small increments to inhibit foaming. A total of 481 g. of acetic anhydride was pumped into the reactor during the run to maintain the catalyst concentration as given. Almost all of the vented chlorine showed up during the last 3 to 7 percent of acetic conversion. The crude product, analyzed on a ferric chloride-free basis, gave 98.7 mole percent equivalent monochloroacetic acid and only 1.31 mole percent dichloroacetic acid. Somewhat earlier in the conversion, a sample analyzed 94.9 mole percent equivalent monochloroacetic acid, 0.87 mole percent dichloroacetic acid, and 4.23 mole percent unreacted acetic acid.

*Example 2*

The procedure of Example 1 was repeated under substantially similar conditions. A sample showed 91.75 mole percent equivalent monochloroacetic acid which contained only 0.99 mole percent dichloroacetic acid.

*Example 3*

Two control runs were made under conditions similar to that of Example 1 except that no ferric chloride was added. In the first run, at a conversion to 92.75 mole percent equivalent monochloroacetic acid, 2.43 mole percent dichloroacetic acid was formed. In the second run, at a conversion of 94.5 mole percent monochloroacetic acid, 2.64 mole percent dichloroacetic acid was formed. At higher monochloroacetic acid conversions, the dichloroacetic acid conversion proceeds at an increasingly more rapid rate.

*Example 4*

The procedure of Example 1 was repeated, substituting one mole percent antimony trichloride, total acetyls basis, for the ferric chloride previously used. At 90 mole percent conversion to monochloroacetic acid, only 0.56 mole percent dichloroacetic acid was formed. The monochloroacetic acid product was substantially colorless.

*Example 5*

The procedure of Example 1 was repeated but with 1.07 mole percent ferric chloride inhibitor instead of about 0.35 mole percent. At a monochloroacetic acid conversion of 99.1 mole percent, only 0.89 mole percent dichloroacetic acid was found.

*Example 6*

The procedure of Example 1 was repeated but with the acetic anhydride concentration maintained at about 6–6.5 mole percent and with a starting amount of 0.1 mole percent of iodine crystals. Free iodine was continuously added with the make-up acetic anhydride to maintain the latter at a 6–6.5 mole percent proportion and to replace iodine vented with hydrogen chloride or reacted. A sample taken near the end of the chlorination showed 89.8 mole percent monochloroacetic acid, 1.09 mole percent dichloroacetic acid, the balance unreacted acetyls.

*Example 7*

The procedure of Example 1 was repeated with 0.93 mole percent aluminum chloride as inhibitor instead of ferric chloride. A sample near the end of the run showed 91.75 mole percent monochloroacetic acid, 1.39 mole percent dichloroacetic acid, the balance unreacted acetyls, aluminum chloride-free basis.

The use of 3 weight percent calcium acetate or sulfuric acid has been taught as an inhibitor of dichloroacetic acid formation. Following the procedure of Example 1 but with 1.09 mole percent calcium acetate inhibitor and 6 mole percent acetyl chloride catalyst, at 95.3 mole percent equivalent conversion to monochloroacetic acid 1.84 mole percent dichloroacetic acid was formed.

Similarly, with 1.0 mole percent sulfuric acid inhibitor and 10–12 mole percent acetyl chloride catalyst, at 96.8 mole percent equivalent monochloroacetic acid, 1.62 mole percent dichloroacetic acid was formed.

Thus, even though much less contaminating inhibitor is used in the process of this invention, still a marked reduction in dichloroacetic acid results as compared with the prior art. The corresponding increase in monochloroacetic acid yield, as pointed out above, is at least three times that of the dichloroacetic acid reduction. For a large tonnage material like monochloroacetic acid, such an improvement is highly significant.

What is claimed is:

1. Method for making monochloroacetic acid by feeding chlorine into a mixture of glacial acetic acid, at least one catalyst of the group consisting of acetic anhydride and acetyl chloride in amount from 6 to 15 mole percent, total acetyls basis, and at least one inhibitor of the group of ferric chloride, antimony trichloride, aluminum chloride and iodine in amount from about 0.1 to about 1 mole percent, total acetyls basis, while heating the mixture to a reaction temperature between 80° and 120° C., introducing additional amounts of at least one of the said catalysts to maintain the catalyst concentration within the above-stated limitations, the chlorine being fed to the mixture over a period between 8 and 100 hours until from 85 to 98 mole percent of the acetyl groups in the reaction mixture have been monochlorinated and recovering monochloroacetic acid product.

2. The method of claim 1 wherein the inhibitor is ferric chloride.

3. The method of claim 1 wherein the inhibitor is antimony trichloride.

4. The method of claim 1 wherein the inhibitor is aluminum chloride.

5. The method of claim 1 wherein the inhibitor is iodine.

6. The method of claim 1 wherein the reaction temperature is maintained at 100° C.

References Cited in the file of this patent

UNITED STATES PATENTS

| | | |
|---|---|---|
| 2,168,260 | Heisel et al. | Aug. 1, 1939 |
| 2,503,334 | Hammond et al. | Apr. 11, 1950 |
| 2,539,238 | Eaker | Jan. 23, 1951 |
| 2,688,634 | Pinkston | Sept. 7, 1954 |
| 2,917,542 | Jordan | Dec. 15, 1959 |